US012498085B2

(12) United States Patent
Yang

(10) Patent No.: US 12,498,085 B2
(45) Date of Patent: Dec. 16, 2025

(54) DENTAL HANDPIECE OILING MACHINE

(71) Applicant: Beyes Dental Canada Inc., Morrisburg (CA)

(72) Inventor: Hua Yang, Morrisburg (CA)

(73) Assignee: BEYES DENTAL CANADA INC., Morrisburg (CA)

( * ) Notice: Subject to any disclaimer, the term of this patent is extended or adjusted under 35 U.S.C. 154(b) by 0 days.

(21) Appl. No.: 18/746,074

(22) Filed: Jun. 18, 2024

(65) Prior Publication Data
US 2025/0243974 A1    Jul. 31, 2025

(30) Foreign Application Priority Data
Jan. 30, 2024 (CN) .......................... 202410133781.5

(51) Int. Cl.
F16N 7/34 (2006.01)
F16N 25/00 (2006.01)

(52) U.S. Cl.
CPC .............. F16N 7/34 (2013.01); F16N 25/00 (2013.01); F16N 2210/00 (2013.01); F16N 2270/72 (2013.01); F16N 2280/00 (2013.01); F16N 2280/02 (2013.01)

(58) Field of Classification Search
CPC .......................................... F16N 7/34
See application file for complete search history.

(56) References Cited

U.S. PATENT DOCUMENTS

| 2,943,705 A |   | 7/1960  | Staunt |                   |
|-------------|---|---------|--------|-------------------|
| 2,969,748 A | * | 1/1961  | Staats | F04F 5/461        |
|             |   |         |        | 417/186           |
| 3,106,021 A | * | 10/1963 | Borden | A61C 1/0007       |
|             |   |         |        | D24/176           |
| 3,106,346 A | * | 10/1963 | Thomas | B05B 7/26         |
|             |   |         |        | 239/416.4         |

(Continued)

FOREIGN PATENT DOCUMENTS

KR    10-1952579 B1    2/2019
KR    10-2023-0070908 A    5/2023

OTHER PUBLICATIONS

The extended European search report of EP patent application No. 24184541.1 issued on Nov. 20, 2024.

(Continued)

Primary Examiner — Michael A Riegelman
(74) Attorney, Agent, or Firm — Andrew C. Cheng

(57) ABSTRACT

A dental handpiece oiling machine includes a lubricating oil delivery circuit, a gas delivery circuit, and an atomizer. The atomizer is respectively connected to the lubricating oil delivery circuit and the gas delivery circuit and includes a gas acceleration structure used for sharply accelerating gas from the gas delivery circuit to form a high-speed gas flow and an atomization structure used for atomizing lubricating oil from the lubricating oil delivery circuit under the action of the high-speed gas flow to form oil mist which is delivered to dental handpieces. Since lubricating oil is broken into mist-like particles by the high-speed gas flow, (Continued)

oil and gas are sufficiently mixed, sufficient lubrication can be realized merely with a small amount of oil, and environmental pollution is greatly reduced; and an oil pump is not needed, so the dental handpiece oiling machine has a simple structure and a long service life.

9 Claims, 3 Drawing Sheets

(56) References Cited

U.S. PATENT DOCUMENTS

| | | | | |
|---|---|---|---|---|
| 3,243,014 | A * | 3/1966 | Bjorklund | F16N 7/34 261/78.2 |
| 3,561,680 | A * | 2/1971 | Ott | B05B 7/045 239/570 |
| 3,618,709 | A * | 11/1971 | Boelkins | F16N 7/32 184/81 |
| 4,218,216 | A | 8/1980 | Haruo | |
| 4,310,309 | A | 1/1982 | Favonio | |
| 4,443,195 | A * | 4/1984 | Matsui | A61C 1/0061 251/63.4 |
| 4,486,174 | A * | 12/1984 | Eibofner | B05B 12/081 433/104 |
| 4,527,661 | A * | 7/1985 | Johnstone | F16C 33/6674 384/468 |
| 5,020,636 | A * | 6/1991 | Daeges | F16N 7/32 184/7.4 |
| 5,226,506 | A * | 7/1993 | Link | F16L 7/02 239/419 |
| 5,302,123 | A * | 4/1994 | Bechard | A61C 19/002 433/104 |
| 6,482,356 | B1 * | 11/2002 | Brown | A61C 19/00 422/26 |
| 7,214,012 | B2 * | 5/2007 | Sugata | B23Q 11/1015 408/59 |
| 7,568,554 | B2 * | 8/2009 | Umber | A61B 17/1644 433/104 |
| 8,881,871 | B2 * | 11/2014 | Divisi | F16N 7/32 184/55.1 |
| D981,570 | S * | 3/2023 | Shi | D24/185 |
| 11,867,076 | B2 * | 1/2024 | Pora | F01M 1/16 |
| 11,885,462 | B2 * | 1/2024 | Lehmann | B05B 1/083 |
| 12,072,061 | B2 * | 8/2024 | Lehmann | B05B 7/0491 |
| 2013/0206441 | A1 * | 8/2013 | Roser | B23Q 11/1046 173/199 |
| 2022/0390067 | A1 * | 12/2022 | Lehman | B05B 1/24 |
| 2023/0020961 | A1 * | 1/2023 | Manca | A24F 40/48 |

OTHER PUBLICATIONS

The office action of counterpart KR patent application No. 10-2024-0083625 issued on May 28, 2025.
The office action of counterpart JP patent application No. 2024-098864 issued on Jun. 24, 2025.

* cited by examiner

DENTAL HANDPIECE OILING MACHINE

FIELD

The invention relates to the technical field of medical instruments, in particular to a dental handpiece oiling machine.

BACKGROUND

Dental handpieces are medical instruments widely used in the department of stomatology to clean teeth and/or grind problematic teeth. The maintenance of dental handpieces relies on dental handpiece oiling machines. Existing dental handpiece oiling machines pump lubricating oil into a pipeline by means of an oil pump and then deliver the lubricating oil into dental handpieces by means of compressed air to lubricate related parts in the dental handpieces; or, existing dental handpiece oiling machines pump oil into a multi-way structure by means of an oil pump and introduce air into the multi-way structure by means of an air inlet structure. However, such a traditional oiling method cannot sufficiently mix oil and air, so the oil content of air entering dental handpieces is non-uniform, that is, part of air contains oil while another part of air does not contain oil, and the oil content of air is completely uncontrollable. In order to sufficiently lubricate dental handpieces, the oiling time often needs to be prolonged in order to inject more lubricating oil into the dental handpieces, leading to the discharge of most lubricating oil into the air. This problem is more prominent in a case where lubricating oil is injected into multiple dental handpieces, which not only results in a waste of oil, but also leads to environmental pollution.

SUMMARY

In view of this, the invention aims to provide a dental handpiece oiling machine which can mix oil and air effectively.

In one aspect, the present invention provides a dental handpiece oiling machine which comprises a lubricating oil delivery circuit; a gas delivery circuit; and an atomizer respectively connected to the lubricating oil delivery circuit and the gas delivery circuit. The atomizer comprises a gas acceleration structure configured for sharply accelerating gas coming from the gas delivery circuit to form an accelerated gas flow and an atomization structure configured for atomizing lubricating oil from the lubricating oil delivery circuit under an action of the accelerated gas flow to form oil mist.

Preferably, a cavity is formed in the atomizer and an oil nozzle is arranged in the cavity; the cavity comprises a throat formed between an outer wall of the oil nozzle and an inner wall of the cavity, a contracted section located at an upstream position of the throat, and an expanded section located at a downstream position of the throat; the contracted section is connected to the gas delivery circuit, and the oil nozzle is connected to the lubricating oil delivery circuit; the contracted section and the throat form the gas acceleration structure, and the expanded section forms the atomization structure; and the contracted section, the throat and the expanded section are connected in sequence, such that the gas is sharply accelerated when flowing from the contracted section into the expanded section through the throat, and the lubricating oil is sucked out under the action of a negative pressure generated in an area in the vicinity of a tail end of the oil nozzle and is mixed with the accelerated gas flow to form oil mist which is output to a plurality of dental handpieces.

Preferably, the atomizer comprises a housing and an atomization core; the cavity is formed in the housing; the atomization core comprises a body and the oil nozzle connected to one end of the body; the atomizer further comprises a gas input channel connected to the gas delivery circuit and a lubricating oil input channel connected to the lubricating oil delivery circuit, the lubricating oil input channel passes through the body and the oil nozzle to be connected to the expanded section; and the gas input channel is arranged on a periphery of the lubricating oil input channel and connected to the contracted section.

Preferably, an outer surface of the body is in convergent transition with an outer surface of the oil nozzle; and a portion, corresponding to the contracted section, of an inner surface of the housing is contracted.

Preferably, the atomization core further comprises a connecting terminal connected to the other end of the body, the connecting terminal is connected to a nipple by means of a connecting tube, the nipple is connected to the lubricating oil delivery circuit, the lubricating oil input channel passes through the connecting terminal and connected to a conduit of the connecting tube, and an inner diameter of the conduit of the connecting tube is greater than an inner diameter of the lubricating oil input channel.

Preferably, the atomizer further comprises a valve body. A receiving cavity, and a first opening and a second opening which are connected to the receiving cavity are formed in the valve body; the receiving cavity is connected to the gas input channel; the gas delivery circuit is connected to the receiving cavity by means of the first opening; the nipple and the connecting tube are arranged in the receiving cavity; and an end of the nipple extends out of the second opening and is connected to the lubricating oil delivery circuit.

Preferably, the lubricating oil delivery circuit is provided with a check valve for preventing the lubricating oil from flowing back.

Preferably, the dental handpiece oiling machine further comprises a distributor, the distributor comprises a plurality of output lines respectively connected to the plurality of dental handpieces, the atomizer further comprises an atomization nozzle, the expanded section passes through the atomization nozzle, and the distributor is connected to the atomization nozzle, such that the oil mist generated by the atomizer is delivered to the plurality of dental handpieces by means of the distributor.

Preferably, the dental handpiece oiling machine further comprises a base and a hood detachably mounted on the base, and the lubricating oil delivery circuit, the gas delivery circuit and the atomizer are mounted on the base and covered by the hood.

Preferably, the gas delivery circuit is provided with an electromagnetic valve, the dental handpiece oiling machine further comprises a controller, and the controller is electrically connected to the electromagnetic valve to control the electromagnetic valve to be turned on or off.

Compared with the prior art, an atomizer is arranged in the dental handpiece oiling machine provided by the invention; after the dental handpiece oiling machine is started, compressed air entering the atomizer will be sharply accelerated when flowing from a contracted section to an expanded section through a throat, and lubricating oil will be sucked out under the action of a negative pressure generated in the atomizer and will be broken by the high-speed air flow into mist-like particles, which are then delivered to to-belubricated parts of dental handpieces. Because the lubricating oil is broken into mist-like particles by the high-speed air flow, oil and air are sufficiently mixed, sufficient lubrication can be realized only by inputting a small amount of oil, multiple dental handpieces can be lubricated at the same time, and uniform lubrication can be realized. The dental handpiece lubricating machine has a simple structure; lubricating oil is sucked out under the action of a negative pressure generated in the atomizer, and an oil pump of an oil supply system is not needed, such that the oiling machine has a long service life, can realize sufficient lubrication with a small amount of lubricating oil, and greatly reduces environmental pollution.

DESCRIPTION OF THE EMBODIMENTS

To facilitate the understanding of the invention, the invention will be described more comprehensively below with reference to related drawings. The drawings illustrate one or more embodiments of the invention to provide a more accurate and thorough understanding of the technical solution disclosed by the invention. However, it should be understood that the invention can be implemented in many different forms and should not be limited to the embodiments described below.

Figure 1:
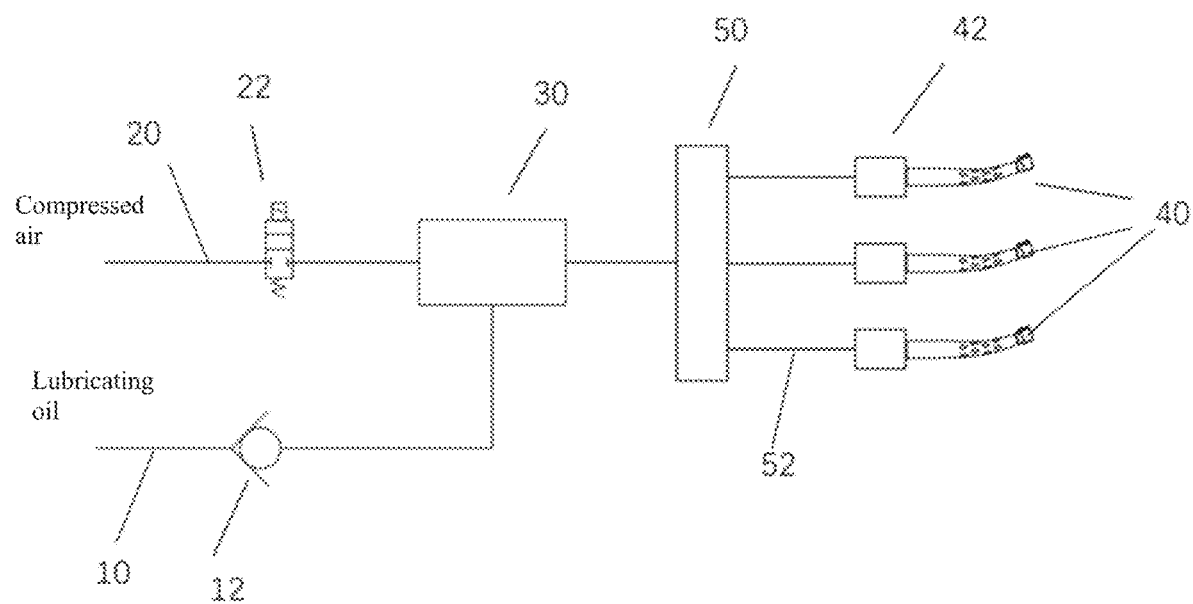
FIG. 1 is a schematic principle diagram of a dental handpiece oiling machine according to an embodiment of the invention.

FIG. 1 is a schematic principle diagram of a dental handpiece oiling machine according to an embodiment of the invention.

Referring to FIG. 1, a dental handpiece oiling machine comprises a lubricating oil delivery circuit 10, a gas delivery circuit 20 and an atomizer 30 respectively connected to the lubricating oil delivery circuit 10 and the gas delivery circuit 20. The atomizer 30 comprises a gas acceleration structure used for sharply accelerating gas from the gas delivery circuit 20 to form an accelerated gas flow, and the atomizer 30 further comprises an atomization structure used for atomizing lubricating oil coming from the lubricating oil delivery circuit 20 under the action of the accelerated gas flow to form oil mist.

Specifically, a cavity is formed in the atomizer 30. An oil nozzle 342 extends into the cavity. The cavity comprises a throat 322 formed between an inner wall of the cavity and an outer wall of the oil nozzle 342, a contracted section 324 located at an upstream position of the throat, and an expanded section 326 located at a downstream position of the throat 322. The contracted section 324 is in communication with the gas delivery circuit 20, and the oil nozzle 342 is in communication with the lubricating oil delivery circuit 10. The contracted section 324 and the throat 322 form the gas acceleration structure, and the expanded section 326 forms the atomization structure. The contracted section 324, the throat 322 and the expanded section 326 are sequentially connected in an air flow direction to form a Laval jet tube structure which has a large space at a front end, a small space in the middle and a large space at a rear end, such that gas is sharply accelerated when flowing from the contracted section 324 into the expanded section 326 through the throat 322, and lubricating oil is sucked out of the oil nozzle 342 under the action of a negative pressure generated at an area in the vicinity of a tail end of the oil nozzle 342 (an area, close to the tail end of the oil nozzle 342, of the expanded section 326), the lubricating oil entering the expanded section 326 is dispersed by the accelerated gas flow to form fine particles, which are sufficiently mixed with the accelerated gas flow to form oil mist which is output to dental handpieces 40 from the expanded section 326.

A cross-sectional area of the contracted section 324 decreases gradually in a direction close to the throat 322. In this embodiment, an inner wall surface of the contracted section 324 comprises a section of conical surface.

A cross-sectional area of the expanded section 326 is greater than a cross-sectional area of the throat 322. In this embodiment, an inner wall surface of the expanded section 326 is a cylindrical surface, and an inner diameter of the expanded section 326 is uniform in a length direction; or, the inner wall surface of the expanded section 326 is horn-shaped, and the inner diameter of the expanded section 326 increases gradually in a direction away from the throat 322. The oil nozzle 342 is shaped like a circular tube, a cross-section of the throat 322 is ring-shaped. Preferably, the cross-sectional area of the expanded section 326 is twice or more times the cross-sectional area of the throat 322, such as 2.5 times, 3 times, 3.5 times, 4, times, 4.5 times, 5 times, 5.5 times, 6 times, 6.5 times, 7 times, 7.5 times, 8 times, 8.5 times, 9 times or 10 times.

Preferably, the dental handpiece oiling machine further comprises a distributor 50, the distributor 50 comprises a plurality of output lines 52 which are respectively connected to a plurality of dental handpieces 40. The distributor 50 is connected to the atomizer 30, such that oil atomized by the atomizer 30 is delivered to the plurality of dental handpieces 40 by means of the distributor 50. Preferably, the dental handpieces 40 are connected to the output lines 52 of the distributor 50 by means of quick connectors 42 to facilitate assembly and disassembly of the dental handpieces 40.

Figure 2:
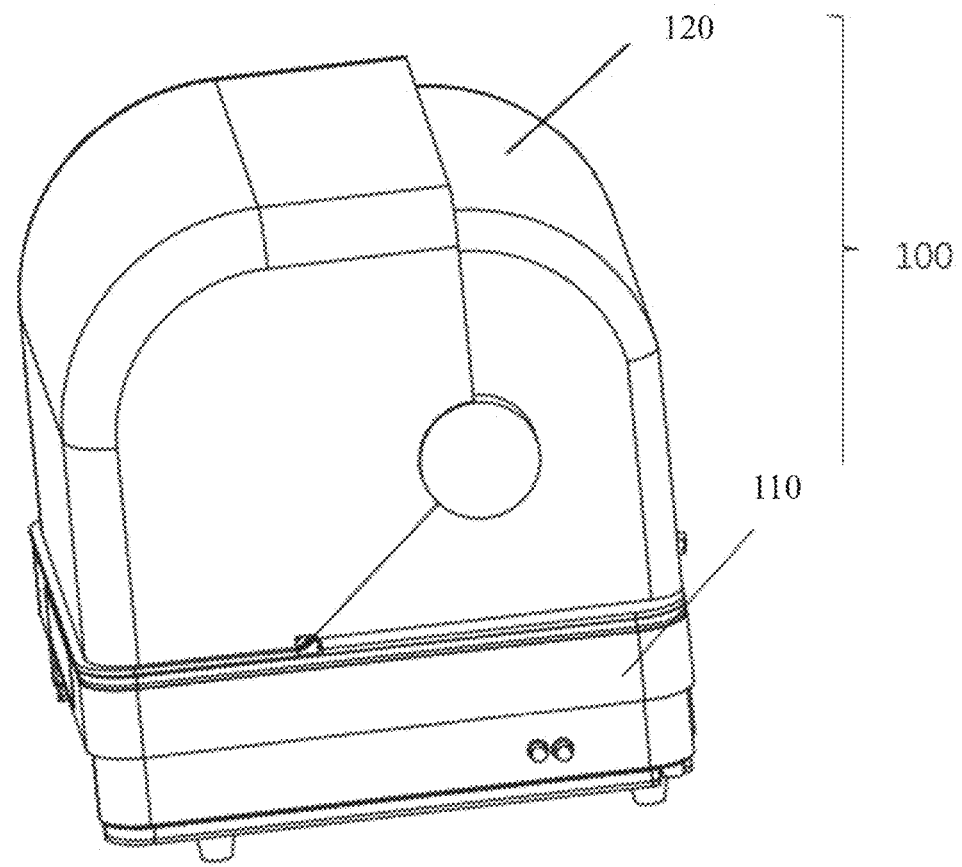
FIG. 2 is a schematic structural diagram of the dental handpiece oiling machine according to one embodiment of the invention.
Figure 3:
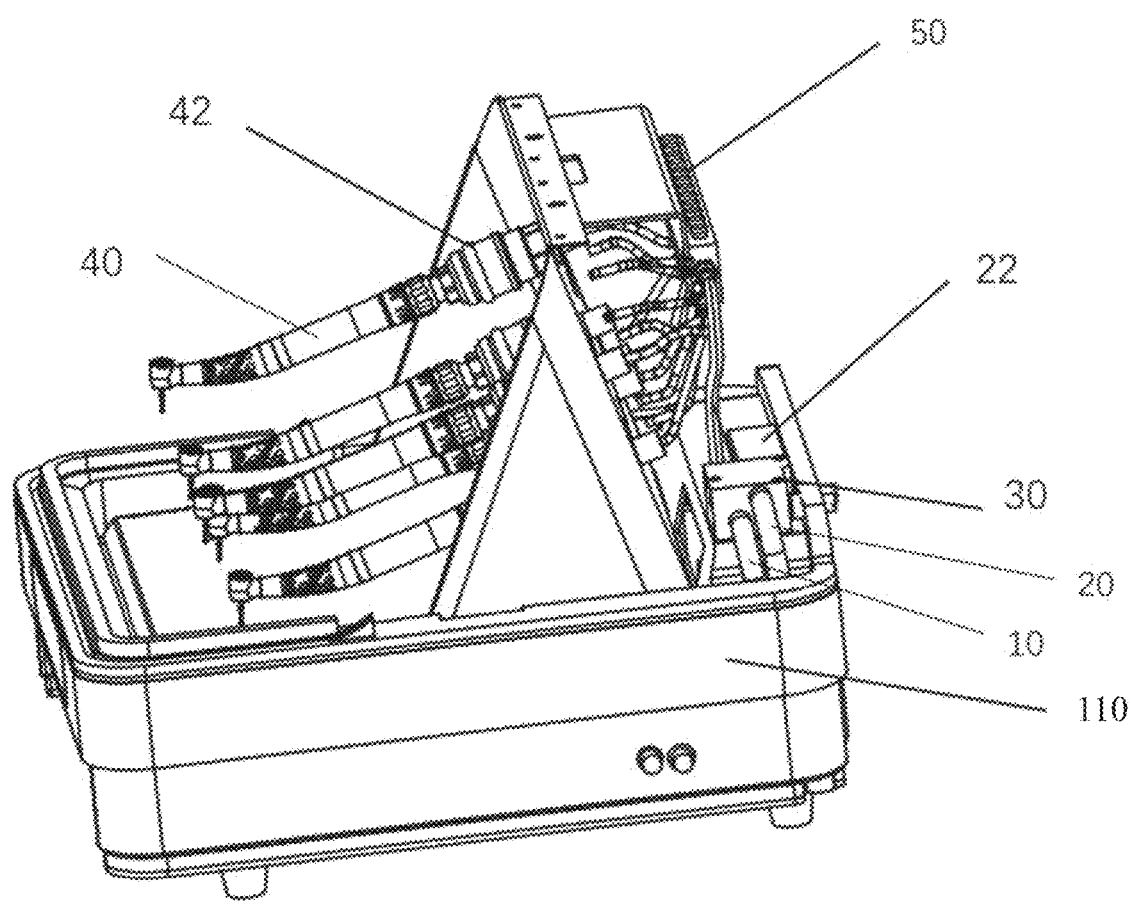
FIG. 3 is a schematic structural diagram of the dental handpiece oiling machine shown in FIG. 2 in a case where a shell is removed.

Referring to FIG. 2 and FIG. 3, the dental handpiece oiling machine further comprises a shell 100, and the lubricating oil delivery circuit 10, the gas delivery circuit 20, the atomizer 30, the dental handpieces 40 and the distributor 50 are all mounted in the shell 100. Specifically, the shell 100 comprises a base 110 and a hood 120 detachably mounted on the base 110, a receiving space is formed between the hood 120 and the base 100, and the lubricating oil delivery circuit 100, the gas delivery circuit 20, the atomizer 30, the dental handpieces 40 and the distributor 50 are all received in the receiving space. When the dental handpieces 40 need to be maintained, the hood 120 can be opened, and then the dental handpieces 40 are respectively connected to the distributor 50 to be maintained.

Figure 4:
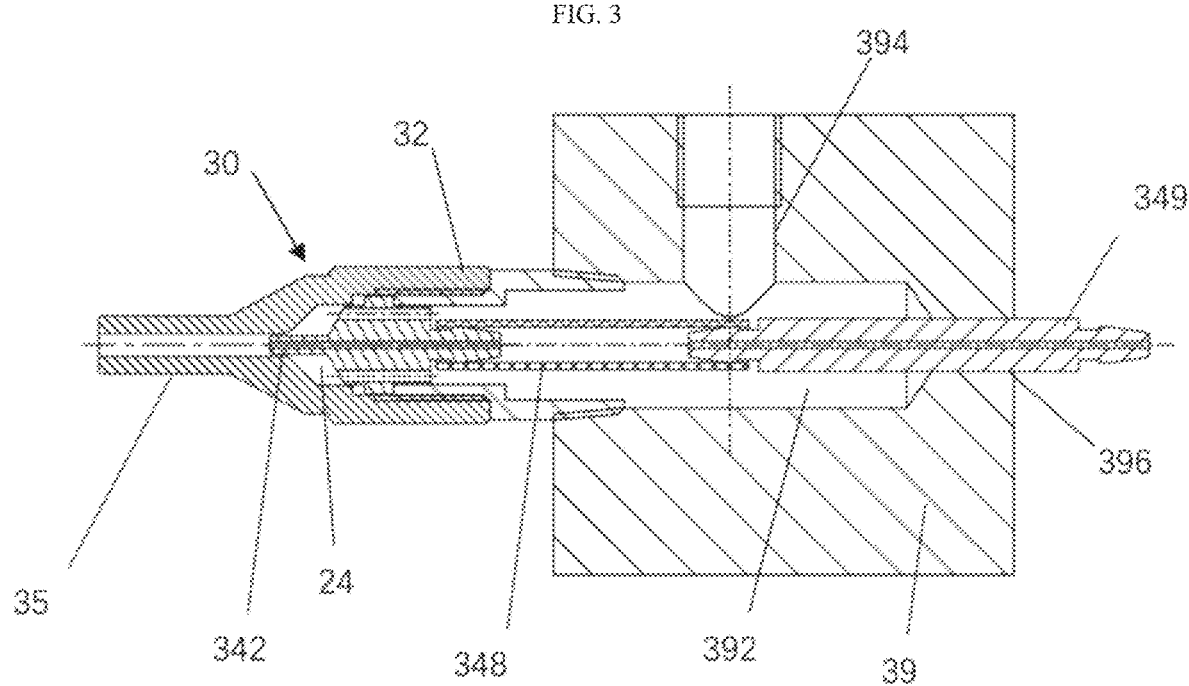
FIG. 4 is a schematic sectional view of an atomizer and an electromagnetic valve of the dental handpiece oiling machine shown in FIG. 3.
Figure 5:
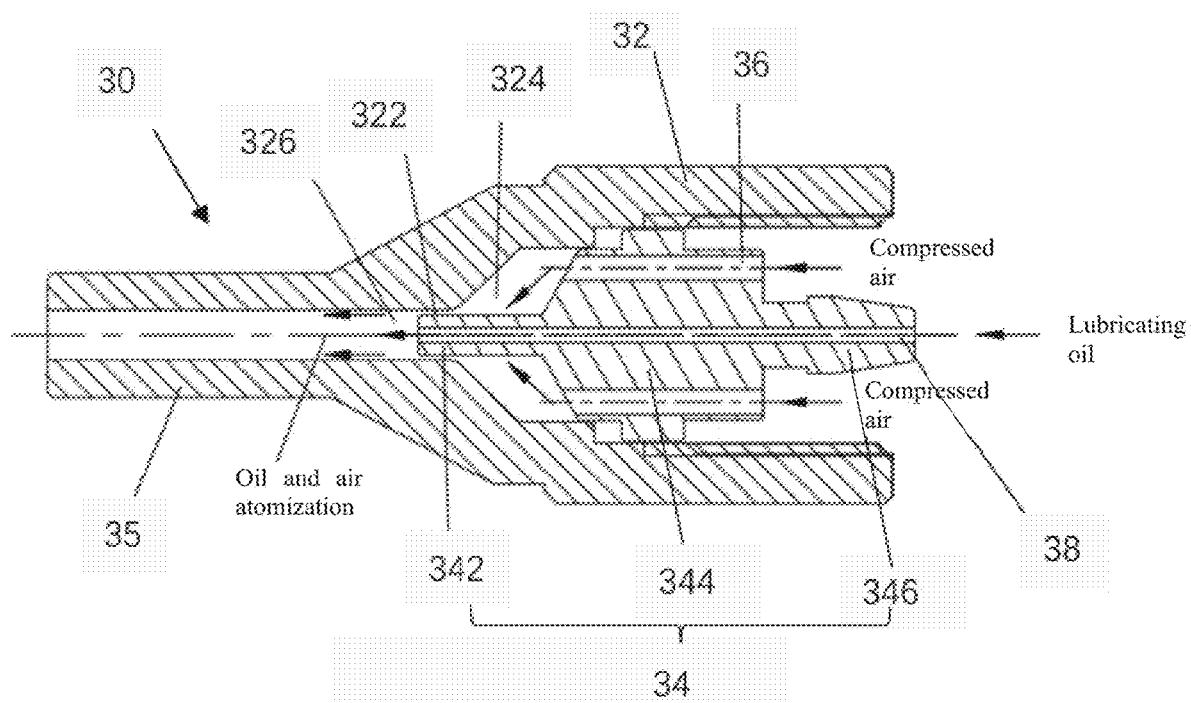
FIG. 5 is an enlarged view of the atomizer shown in FIG. 4.

Referring to FIG. 4 and FIG. 5, the atomizer 30 comprises a housing 32 and an atomization core 34 received in the housing 32. The cavity is formed in the housing 32. The atomization core 34 comprises a body 344, the oil nozzle 342 located at one end of the body 344, and a connecting terminal 346 located at the other end of the body 344. The cavity comprises the throat 322 formed between the inner wall of the cavity and the outer wall of the oil nozzle 342, the contracted section 342 located at an upstream position of the throat, and the expanded section 326 located at a downstream position of the throat 322. In this specification, "upstream" and "downstream" are defined according to the flow direction of fluid. The contracted section 324 comprises a contracted end (an end with a small inner diameter) close to the throat 322 and an open end (an end with a large diameter) away from the throat 322. The body 344 is received in the open end of the contracted section 324, and the oil nozzle 342 extends from the body 344 and passes through the contracted end of the contracted section 324 to be inserted into the expanded section 326, such that the throat 322 is formed between the outer surface of the oil nozzle 342 and the inner surface of the housing 32 and is located at a joint of the contracted end of the contracted section 324 and the expanded section 326. A cross-sectional area of the contracted end of the contracted section 324 decreases gradually in a direction close to the throat 322, and a cross-sectional area of the expanded section 326 is greater than a cross-sectional area of the throat 322. In this way, in the direction from the contracted section 324 to the expanded section 326, the cross-sectional area of a passage decreases sharply at the position of the throat 322 and increases sharply after passing through the throat 322 (at a downstream position of the throat 322), thus forming a Laval jet tube structure.

Preferably, an outer diameter of the body 344 is greater than an outer diameter of the oil nozzle 342 and the connecting terminal 346, an outer surface of the body 344 is connected to the outer surface of the oil nozzle 342 preferably by means of a slope, and the slope faces another slope of the contracted section 324 formed by the inner surface of the housing 32. A gas input channel 36 is arranged between the body 344 and the housing 32 and connected to the contracted section 324. In this embodiment, the gas input channel 36 is arranged on the body 344 and located between the contracted section 324 and the gas delivery circuit 20. A lubricating oil input channel 34 is arranged at the center of the atomization core 34 and sequentially extends through the connecting terminal 346, the body 344 and the oil nozzle 342. The connecting terminal 346 of the atomization core 34 is connected to a nipple 349 by means of a connecting tube 348, and an inner diameter of the connecting tube 348 is greater than an inner diameter of the lubricating oil input channel 38.

The atomizer 30 further comprises a valve body 39 which is in seal connection with the housing 32. A receiving cavity 392, and a first opening 394 and a second opening 396 which are connected to the receiving cavity 392 are formed in the valve body 39. The gas delivery circuit 20 is connected to the first opening 394, and the receiving cavity 392 and the contracted section 324 are connected by means of the gas input channel 36. The nipple 349 and the connecting tube 348 are arranged in the receiving cavity 392, and one end of the nipple 349 extends out of the second opening 396 and is connected to the lubricating oil delivery circuit 10. Preferably, an inner diameter of the connecting tube 348 is greater than an inner diameter of the nipple 349, such that the connecting tube 348 can be disposed around the nipple 349.

The atomizer 30 further comprises an atomization nozzle 35 formed at an end, away from the valve body 39, of the housing 32. The expanded section 326 passes through the atomization nozzle 35, and the distributor 50 is connected to the atomization nozzle 35 by means of a connecting line, such that oil mist generated by the atomizer 30 can be delivered to the plurality of dental handpieces 40 by means of the distributor.

Figure 6:
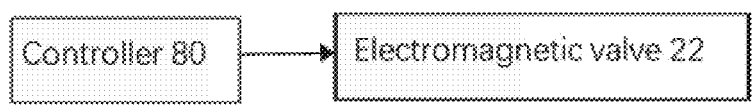
FIG. 6 is a schematic connection diagram of a controller and an electromagnetic valve.

The dental handpiece oiling machine further comprises an electromagnetic valve 22 connected between the gas delivery circuit 20 and the atomizer 30, and the turn-on time of the electromagnetic valve 22 can be adjusted as needed. Preferably, referring to FIG. 6, the dental handpiece oiling machine may further comprise a controller 80, which is electrically connected to the electromagnetic valve 22 and used for controlling the turn-on time of the electromagnetic valve 12. For example, for dental handpieces of a complex structure, a mode in which the controller 80 controls the turn-on time of the electromagnetic valve 12 to be relatively long, such as 2-3 seconds, can be selected. For dental handpieces of a simple structure, another mode in which the controller 80 controls the turn-on time of the electromagnetic valve 22 to be relatively short, such as 1-2 seconds, can be selected.

The lubricating oil delivery circuit 10 is provided with a check valve 12 for preventing lubricating oil from flowing back.

The oil and air control principle of the dental handpiece oiling machine is described in detail below:

When compressed air of the gas delivery circuit 20 enters the atomizer 30 after passing through the electromagnetic valve 22, a negative pressure is generated in the atomizer 30, lubricating oil of the lubricating oil delivery circuit 10 flows into the atomizer 30 after passing through 12 under atmospheric pressure and is mixed with the compressed air to form oil mist, and the oil mist reaches the quick connectors 42 by means of the distributor 50 and then flows into the dental handpieces 40 to lubricate components of the dental handpieces.

Specifically, compressed air enters the receiving cavity 392 of the atomizer 30 by means of the electromagnetic valve 22 and then enters the contracted section 324 by means of the gas input channel 36; because the small annular space of the throat 322 has a large space connected with the front end of the throat 322, a small space around the throat 322 and a large space connected at the rear end of the throat 322, when the compressed air reaches the front end of the annular space (the contracted section 324), the flow rate of the compressed air is relative low, and the pressure is increased. When the compressed air flows through the throat 322, the flow rate of the air increases; when the compressed air flows through the expanded section 326, the air expands quickly, the flow rate of the air further increases, a negative pressure is generated in the vicinity of the oil nozzle 342, lubricating oil flows out of the oil nozzle 342 and enters the atomizer 30 under atmospheric pressure, and the lubricating oil flowing out of the oil nozzle 342 is quickly dispersed by the high-speed air flow to form fine particles, which are mixed with the high-speed air flow to form oil mist.

According to the dental handpiece oiling machine, the atomizer is arranged in the oiling machine. After the dental handpiece oiling machine is started, compressed air entering the atomizer will be sharply accelerated when flowing from the contracted section to the expanded section through the throat, and lubricating oil will be sucked out under the action of a negative pressure generated in the atomizer and will be broken by the high-speed air flow into mist-like particles, which are then delivered to to-be-lubricated parts of dental handpieces. Because the lubricating oil is broken into mist-like particles by the high-speed air flow, oil and air are sufficiently mixed, sufficient lubrication can be realized only by inputting a small amount of oil, multiple dental handpieces can be lubricated at the same time, and uniform lubrication can be realized. The dental handpiece lubricating machine has a simple structure; lubricating oil is sucked out under the action of a negative pressure generated in the atomizer, and an oil pump is not needed for an oil supply system, such that the oiling machine has a long service life, can realize sufficient lubrication with a small amount of lubricating oil, and greatly reduces environmental pollution.

It should be noted that the invention is not limited to the above embodiments, other transformations can be made by those skilled in the art according to the creative spirit of the invention, and all these transformations made according to the creative spirit of the invention should fall within the protection scope of the invention.

What is claimed is:

1. A dental handpiece oiling machine, comprising:
a lubricating oil delivery circuit;
a gas delivery circuit; and
an atomizer respectively connected to the lubricating oil delivery circuit and the gas delivery circuit;
wherein the atomizer comprises a gas acceleration structure configured for sharply accelerating gas coming from the gas delivery circuit to form an accelerated gas flow and an atomization structure configured for atomizing lubricating oil from the lubricating oil delivery circuit under an action of the accelerated gas flow to form oil mist;
a cavity is formed in the atomizer and an oil nozzle is arranged in the cavity;
the cavity comprises a throat formed between an outer wall of the oil nozzle and an inner wall of the cavity, a contracted section located at an upstream position of the throat, and an expanded section located at a downstream position of the throat;
the contracted section is connected to the gas delivery circuit, and the oil nozzle is connected to the lubricating oil delivery circuit;
the contracted section and the throat form the gas acceleration structure, and the expanded section forms the atomization structure; and
the contracted section, the throat and the expanded section are connected in sequence such that the gas is sharply accelerated when flowing from the contracted section into the expanded section through the throat, and the lubricating oil is sucked out under the action of a negative pressure generated in an area in the vicinity of a tail end of the oil nozzle and is mixed with the accelerated gas flow to form oil mist which is output to a plurality of dental handpieces.

2. The dental handpiece oiling machine according to claim 1, wherein the atomizer comprises a housing and an atomization core;
the cavity is formed in the housing;
the atomization core comprises a body and the oil nozzle connected to one end of the body;
the atomizer further comprises a gas input channel connected to the gas delivery circuit and a lubricating oil input channel connected to the lubricating oil delivery circuit, the lubricating oil input channel passes through the body and the oil nozzle to be connected to the expanded section; and
the gas input channel is arranged on a periphery of the lubricating oil input channel and connected to the contracted section.

3. The dental handpiece oiling machine according to claim 2, wherein an outer surface of the body is in convergent transition with an outer surface of the oil nozzle; and
a portion, corresponding to the contracted section, of an inner surface of the housing is contracted.

4. The dental handpiece oiling machine according to claim 2, wherein the atomization core further comprises a connecting terminal connected to the other end of the body, the connecting terminal is connected to a nipple by means of a connecting tube, the nipple is connected to the lubricating oil delivery circuit, the lubricating oil input channel passes through the connecting terminal and connected to a conduit of the connecting tube, and an inner diameter of the conduit of the connecting tube is greater than an inner diameter of the lubricating oil input channel.

5. The dental handpiece oiling machine according to claim 4, wherein the atomizer further comprises a valve body;
a receiving cavity, and a first opening and a second opening which are connected to the receiving cavity are formed in the valve body;
the receiving cavity is connected to the gas input channel;
the gas delivery circuit is connected to the receiving cavity by means of the first opening;
the nipple and the connecting tube are arranged in the receiving cavity; and
an end of the nipple extends out of the second opening and is connected to the lubricating oil delivery circuit.

6. The dental handpiece oiling machine according to claim 5, wherein the lubricating oil delivery circuit is provided with a check valve for preventing the lubricating oil from flowing back.

7. The dental handpiece oiling machine according to claim 1, wherein the dental handpiece oiling machine further comprises a distributor, the distributor comprises a plurality of output lines respectively connected to the plurality of dental handpieces, the atomizer further comprises an atomization nozzle, the expanded section passes through the atomization nozzle, and the distributor is connected to the atomization nozzle, such that the oil mist generated by the atomizer is delivered to the plurality of dental handpieces by means of the distributor.

8. The dental handpiece oiling machine according to claim 1, wherein the dental bandpiece oiling machine further comprises a base and a hood detachably mounted on the base, and the lubricating oil delivery circuit, the gas delivery circuit and the atomizer are mounted on the base and covered by the hood.

9. The dental handpiece oiling machine according to claim 1, wherein the gas delivery circuit is provided with an electromagnetic valve, the dental handpiece oiling machine further comprises a controller, and the controller is electrically connected to the electromagnetic valve to control the electromagnetic valve to be turned on or off.

* * * * *